United States Patent
Ojio et al.

(10) Patent No.: US 6,355,190 B1
(45) Date of Patent: *Mar. 12, 2002

(54) METHOD OF MOLDING OPHTHALMIC LENS PRODUCT, AND MOLD ASSEMBLY USED IN THE METHOD

(75) Inventors: Tatsuya Ojio; Kazuharu Niwa, both of Kasugai; Keiji Yamashita, Nagoya; Akihiro Yasuda, Ichinomiya, all of (JP)

(73) Assignee: Menicon Co., Ltd., Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/333,401

(22) Filed: Jun. 15, 1999

(30) Foreign Application Priority Data

Jun. 19, 1998 (JP) .......................................... 10-172572

(51) Int. Cl.$^7$ .............................................. B29D 11/00
(52) U.S. Cl. ......................... 264/1.1; 249/117; 264/2.5; 425/808
(58) Field of Search ................................ 264/1.1, 1.36, 264/1.38, 2.5, 101, 102; 425/174.4, 175, 808; 249/117, 121

(56) References Cited

U.S. PATENT DOCUMENTS

| | | | |
|---|---|---|---|
| 3,380,718 A | * 4/1968 | Neefe | .......................... 425/808 |
| 4,113,224 A | 9/1978 | Clark et al. | |
| 5,110,514 A | * 5/1992 | Soane | .......................... 425/808 |
| 5,185,107 A | 2/1993 | Blake | |
| 5,281,372 A | * 1/1994 | Hayashi et al. | ............... 264/2.5 |
| 5,578,332 A | 11/1996 | Hamilton et al. | |

FOREIGN PATENT DOCUMENTS

| | | |
|---|---|---|
| JP | 4-290706 | 10/1992 |
| JP | 9-28723 | 2/1997 |

* cited by examiner

*Primary Examiner*—Mathieu D. Vargot
(74) *Attorney, Agent, or Firm*—Burr & Brown (57) ABSTRACT

A method of molding an ophthalmic lens product by using a mold assembly which has a mold cavity, the lens product having a configuration corresponding to that of an ophthalmic lens or a precursor of the ophthalmic lens and being obtained by polymerizing a liquid monomer composition in the mold cavity to provide a polymer product which gives the lens product, the method comprising the steps of: preparing the mold assembly having a monomer storage space for storing the liquid monomer composition, which storage space is held in fluid communication with the mold cavity; filling the mold cavity of the mold assembly with the liquid monomer composition while the liquid monomer composition is accommodated in the monomer storage space; and polymerizing the liquid monomer composition at a temperature of 10–80° C. while a pressure higher than the atmospheric pressure is applied directly to a liquid surface of a mass of the liquid monomer composition accommodated in the monomer storage space.

21 Claims, 6 Drawing Sheets

METHOD OF MOLDING OPHTHALMIC LENS PRODUCT, AND MOLD ASSEMBLY USED IN THE METHOD

The present application is based on Japanese Patent Application No. 10-172572 filed Jun. 19, 1998, the content of which is incorporated hereinto by reference.

BACKGROUND OF THE INVENTION

1. Field of the Invention

The present invention relates in general to molding of an ophthalmic lens product by using a mold assembly which has a mold cavity. In particular, the invention is concerned with the method of molding such a lens product having a configuration corresponding to that of the ophthalmic lens such as an intraocular lens or a contact lens, or a configuration corresponding to that of a precursor of the ophthalmic lens, by polymerizing a monomer composition in the mold cavity to provide a polymer product which constitutes the lens product.

2. Discussion of the Related Art

There have been known various methods for forming an ophthalmic lens product having a configuration or geometry corresponding to that of an ophthalmic lens such as an intraocular lens or a contact lens, or a configuration corresponding to that of a precursor of the ophthalmic lens, more precisely, a lens product which gives at least an optical portion of the intended ophthalmic lens. For instance, the lens product is obtained by effecting a machining operation on a bar-shaped or block-shaped polymer product, such as cutting and grinding. Alternatively, the lens product is obtained by a molding operation using a mold assembly which has a mold cavity. Namely, a monomer composition that gives the polymer product is introduced into the mold cavity of the mold assembly, and is polymerized to form an intended ophthalmic lens whose configuration corresponds to that of the mold cavity.

U.S. Pat. No. 4,113,224 and JP-A-4-290706 disclose one example of the method of molding the lens product by using a mold assembly consisting of a combination of two mold members such as a male mold and a female mold, a cavity-defining mold and a core mold, or an upper mold and a lower mold. The two mold members are assembled together so as to define therebetween a mold cavity having a configuration of the intended lens product. The mold cavity defined upon assembling of the two mold members is filled with a suitable monomer composition, and the monomer composition is polymerized to produce the lens product. In the mold assembly of the above US patents, a reservoir or storage chamber for storing an excess of the monomer composition is formed in a portion of the mold assembly radially outwards of the mold cavity. During the polymerization of the monomer composition in the mold cavity, the monomer composition accommodated in the reservoir or storage chamber is supplied to the mold cavity, so as to compensate for a volume of shrinkage of the monomer composition caused during its polymerization. Accordingly, the lens product obtained as a polymer product has a geometry following that of the mold cavity. In the method disclosed in the above U.S. patents, however, the polymerization of the monomer composition in the mold cavity is effected under the atmospheric pressure, and the monomer composition accommodated in the reservoir or storage chamber is not forced to flow into the mold cavity, but is fed thereinto by gravity. According to this arrangement, the monomer composition may not be supplied to the mold cavity in an amount sufficient to compensate for its polymerization shrinkage in the mold cavity. In this case, the molded surfaces of the lens product serving as the optical surfaces of the intended ophthalmic lens do not have the respective desired profiles which exactly follow those of the molding surfaces of the mold assembly defining the mold cavity. Thus, in the method disclosed in the above-indicated U.S. patents, the optical surfaces of the lens product do not have high accuracy of configuration.

U.S. Pat. No. 5,578,332 discloses a method of cast molding a contact lens by using a mold assembly consisting of a first and a second mold, which have respective molding surfaces for defining a mold cavity when they are assembled together. The mold cavity is filled with a monomer, and the monomer is polymerized to produce the intended contact lens with the mold assembly being subjected to superatmospheric pressure in a pressure vessel. The application of the superatmospheric pressure to the mold assembly accommodated in the pressure vessel ensures that the molding surfaces of the two molds are subjected to a loading pressure, so that they are deflected and kept in contact with the monomer as the monomer shrinks in volume during its polymerization. In this method, however, since the molding surfaces of the two molds are deflected due to the loading pressure acting thereon upon application of the superatmospheric pressure to the mold assembly in the pressure vessel, the profiles of the molding surfaces change so as to remain in contact with the shrinking lens monomer during its polymerization. This arrangement wherein the profiles of the molding surfaces change during the polymerization of the monomer may not provide the intended contact lens with high accuracy of configuration.

JP-A-9-28723 discloses a method of producing a soft intraocular lens by using a mold assembly consisting of an upper and a lower mold, which are assembled together such that they are fluid-tightly sealed to define therebetween a mold cavity which is filled with a monomer composition. The monomer composition in the mold cavity is polymerized with the mold assembly being subjected to a nitrogen pressure of 2.0 kg/cm$^2$ at a temperature of 110° C. for two hours. Since the mold assembly disclosed in this publication is fluid-tightly sealed, the monomer composition in the mold cavity is not subjected to the nitrogen pressure unless the molding surfaces deflect or deform so as to be in contact with the shrinking monomer composition in the mold cavity. In this case, the monomer composition in the mold cavity may not be formed into the intraocular lens having a desired configuration corresponding to that of the mold cavity. On the other hand, if the molding surfaces deflect or deform so as to be in contact with the monomer composition in the mold cavity which shrinks during the polymerization, the mold assembly may suffer from a problem similar to that experienced in the above U.S. Pat. No. 5,578,332. In other words, the intraocular lens to be obtained by using the mold assembly does not have optical surfaces with high accuracy of configuration due to the deflection or deformation of the molding surfaces.

SUMMARY OF THE INVENTION

It is therefore a first object of the present invention to provide a method of molding an ophthalmic lens product by using a mold assembly having a mold cavity and a monomer storage portion, which method permits production of the lens product whose molded surfaces corresponding to the optical surfaces of the intended ophthalmic lens have high accuracy of configuration, exactly following the profiles of the molding surfaces of the mold assembly, while compensating for a volume of shrinkage of the monomer composition during its polymerization, by effectively supplying the monomer composition from the monomer storage space into the mold cavity, so as to provide the lens product having a desired configuration.

A second object of the invention is to provide a mold assembly suitable for practicing the method of the invention.

The above first object of the present invention may be attained according to a principle of the invention, which provides a method of molding an ophthalmic lens product by using a mold assembly which has a mold cavity, the lens product having a configuration corresponding to that of an ophthalmic lens or a precursor of the ophthalmic lens and being obtained by polymerizing a liquid monomer composition in the mold cavity to provide a polymer product which gives the lens product, the method comprising the steps of: preparing the mold assembly having a monomer storage space for storing the liquid monomer composition, which storage space is held in fluid communication with the mold cavity; filling the mold cavity of the mold assembly with the liquid monomer composition while the liquid monomer composition is accommodated in the monomer storage space; and polymerizing the liquid monomer composition at a temperature of 10–80° C. while a pressure higher than the atmospheric pressure is applied directly to a liquid surface of a mass of the liquid monomer composition accommodated in the monomer storage space.

In the above method of the present invention, the liquid monomer composition in the mold cavity is polymerized under application of a pressure higher than the atmospheric pressure directly to the liquid surface of the monomer composition accommodated in the monomer storage space which is held in fluid communication with the mold cavity. Owing to the pressure applied to the mass of the monomer composition in the monomer storage space in the mold assembly, the monomer composition present in the storage space is fed into the mold cavity via a passage formed in the mold assembly, to thereby effectively compensate for a volume of shrinkage of the monomer composition in the mold cavity during its polymerization. According to this arrangement, the optical surfaces of the lens product have a significantly enhanced accuracy of configuration without being adversely affected by the polymerization shrinkage of the monomer composition.

Although the monomer storage space in the mold assembly constructed as described above is open to the external space, the evaporation of the monomer composition is minimized by applying a suitable pressure higher than the atmospheric pressure to the monomer composition accommodated in the storage space. Further, the monomer composition is polymerized at a relatively low temperature in a range of 10–80° C., to thereby effectively prevent the evaporation of the monomer composition, as compared when the monomer composition is polymerized at a relatively high temperature according to the conventional methods. Accordingly, the polymer product to be obtained does not suffer from a variation in its composition, in other words, the lens product to be obtained does not suffer from a variation of its properties, so that the lens product has an intended high quality.

In a first preferred form of the present invention, the mold assembly comprises: (a) a cylindrical body having an inner bore; (b) a lower mold half consisting of a cylindrical base portion which is fitted in a lower portion of the inner bore, so as to close a lower open end of the inner bore, and a cylindrical molding portion protruding from an upper surface of the base portion in an axially upward direction of the mold assembly and having an end face serving as a lower molding surface which has a profile following that of one of opposite surfaces of the lens product, the molding portion having a diameter smaller than that of the base portion so as to define a lower annular spacing between an outer circumferential surface of the molding portion and an inner circumferential surface of the cylindrical body; and (c) an upper mold half consisting of a cylindrical base portion which is fitted in an upper portion of the inner bore so as to partially define an upper chamber for accommodating the mass of the monomer composition, on the side of an upper open end of the inner bore, and a cylindrical molding portion protruding from a lower surface of the base portion in an axially downward direction of the mold assembly and having an end face serving as an upper molding surface which has a profile following that of the other surface of the lens product, the molding portion of the upper mold half having a diameter smaller than that of the base portion so as to define an upper annular spacing between an outer circumferential surface of the molding portion and the inner circumferential surface of the cylindrical body, the lower annular spacing and the upper annular spacing cooperating to provide an annular intermediate chamber, while the upper molding surface and the lower molding surface cooperating with each other to define therebetween the mold cavity such that a circumferential opening open to the annular intermediate chamber is formed along an entire circumference of the mold cavity, for introducing the monomer composition into the intermediate chamber, the base portion having a plurality of through-holes formed therethrough such that the through-holes are equiangularly spaced from each other in the circumferential direction of the base portion and communicate with the upper chamber and the intermediate chamber.

In the mold assembly constructed as described above, the mold cavity is filled with the monomer composition fed from the intermediate chamber via the plurality of through-holes formed through the upper base portion of the upper mold half, while the intermediate chamber and the mold cavity are deaerated via the through-holes. Thus, the through-holes of the present mold assembly serve as not only monomer inlet holes, but also deaerating holes. The present mold assembly does not require any light shielding means for protecting any portion of the monomer composition against exposure to a radiation used for the polymerization and any mechanism for removing the molded polymer product from the mold assembly, as provided in the conventional mold assembly, resulting in a simplified structure of the mold assembly. In the mold assembly used in the present invention, the plurality of through-holes are formed through the upper base portion of the upper mold half, such that the through-holes are equiangularly spaced from each other in the circumferential direction of the upper base portion, that is, in the circumferential direction of the mold cavity, to thereby permit a uniform or even flow of the monomer composition into the molding cavity via the through-holes. In addition, the intermediate chamber surrounding the mold cavity and filled with the monomer composition assures an effective flow of the monomer composition into the mold cavity, resulting in even or uniform supply of the monomer composition into the mold cavity to compensate for the shrinkage of the monomer composition during its polymerization. Accordingly, the lens product to be obtained has improved surface consistency.

Preferably, the mold assembly further comprises inlet defining means for defining an inlet at the upper open end of the inner bore, which inlet permits communication between the upper chamber and an exterior of the mold assembly, so that a pressurized gas is introduced into the upper chamber.

Preferably, in the present method, the step of filling the mold cavity comprises introducing the monomer composition into the intermediate chamber from the upper chamber, and feeding the monomer composition from the intermediate chamber into the mold cavity through the circumferential opening, so as to fill the mold cavity and the intermediate chamber with the monomer composition, and store the mass of the monomer composition in the upper chamber, and wherein the step of polymerizing the monomer composition comprises placing the mold assembly in a pressure vessel, and introducing the pressurized gas having a pressure higher than the atmospheric pressure into the pressure vessel, so that the pressurized gas acts directly on the mass of the monomer composition in the upper chamber through the inlet, and the monomer composition in the mold cavity, the intermediate chamber and the upper chamber is polymerized so as to provide an integral assembly which includes the polymer product and the lower and upper mold halves; and separating the lens product formed in the mold cavity from a rest of the integral assembly.

In a second preferred form of the present invention, the pressurized gas has a pressure which is higher than the atmospheric pressure by 0.05–1.0 MPa.

In a third preferred form of the present invention, the step of polymerizing the monomer composition is effected at a temperature in a range of 30–60° C.

The above-described second object may be attained according to the present invention.

BRIEF DESCRIPTION OF THE DRAWINGS

The above and option objects, features, advantages and technical significance of the present invention will be better understood by reading the following detailed description of presently preferred embodiments of the invention, when considered in conjunction with the accompanying drawings, in which.

DETAILED DESCRIPTION OF PREFERRED EMBODIMENTS

According to the present method of molding an ophthalmic lens product, the lens product to be obtained has a configuration corresponding to that of an intended ophthalmic lens or its precursor, and the lens product gives at least an optical portion of the intended ophthalmic lens. Such a lens product is constituted by a polymer product obtained by polymerizing a liquid monomer composition, using a mold assembly which has a mold cavity having a profile following that of the lens product, and a monomer storage portion which is held in fluid communication with the mold cavity for permitting a flow of the monomer composition therefrom into the mold cavity. The mold assembly preferably has a structure as shown in FIGS. 1 and 2, in which a suitable pressure is applied directly to the liquid surface of the monomer composition accommodated in the storage portion according to the present invention.

Figure 1:
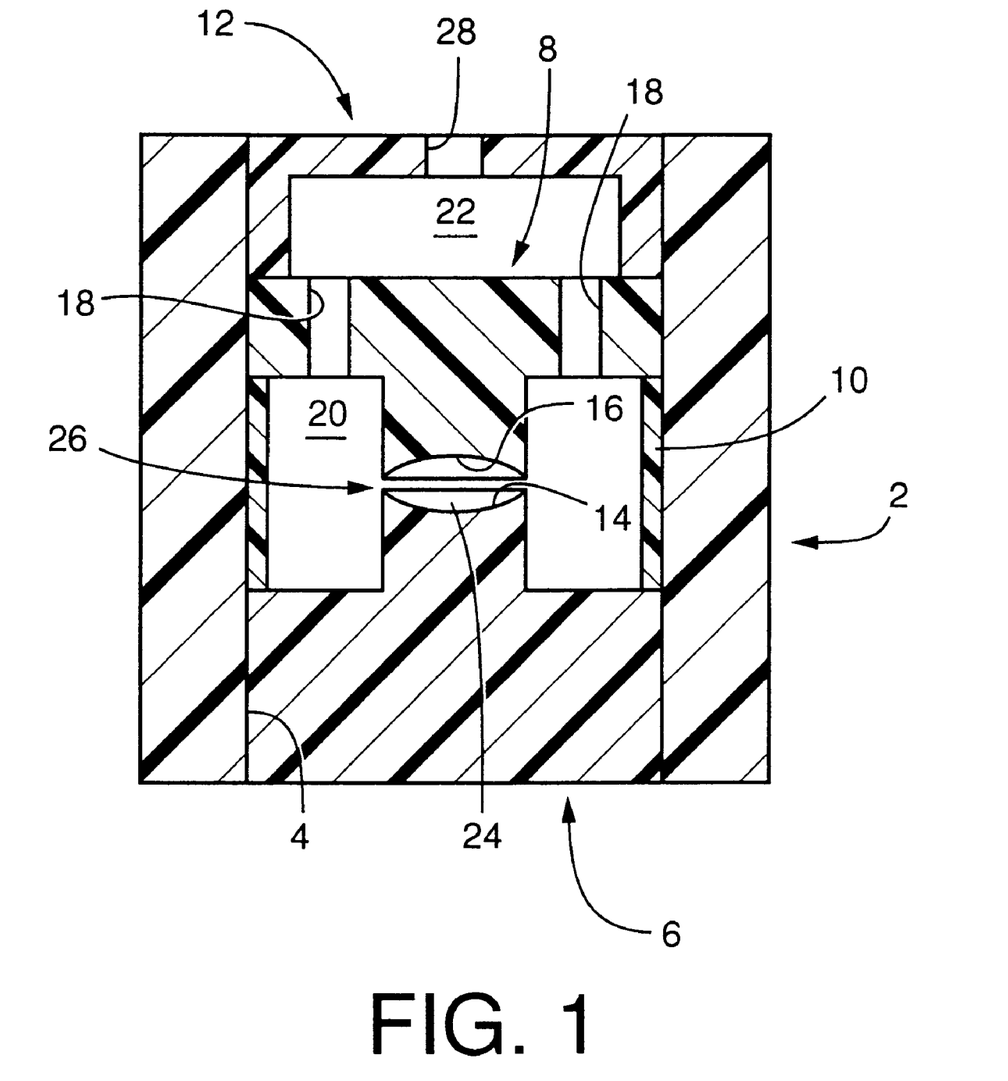
FIG. 1 is an elevational view in axial cross section of a mold assembly for molding an ophthalmic lens product, which mold assembly is suitably used according to one embodiment of the present invention.
Figure 2:
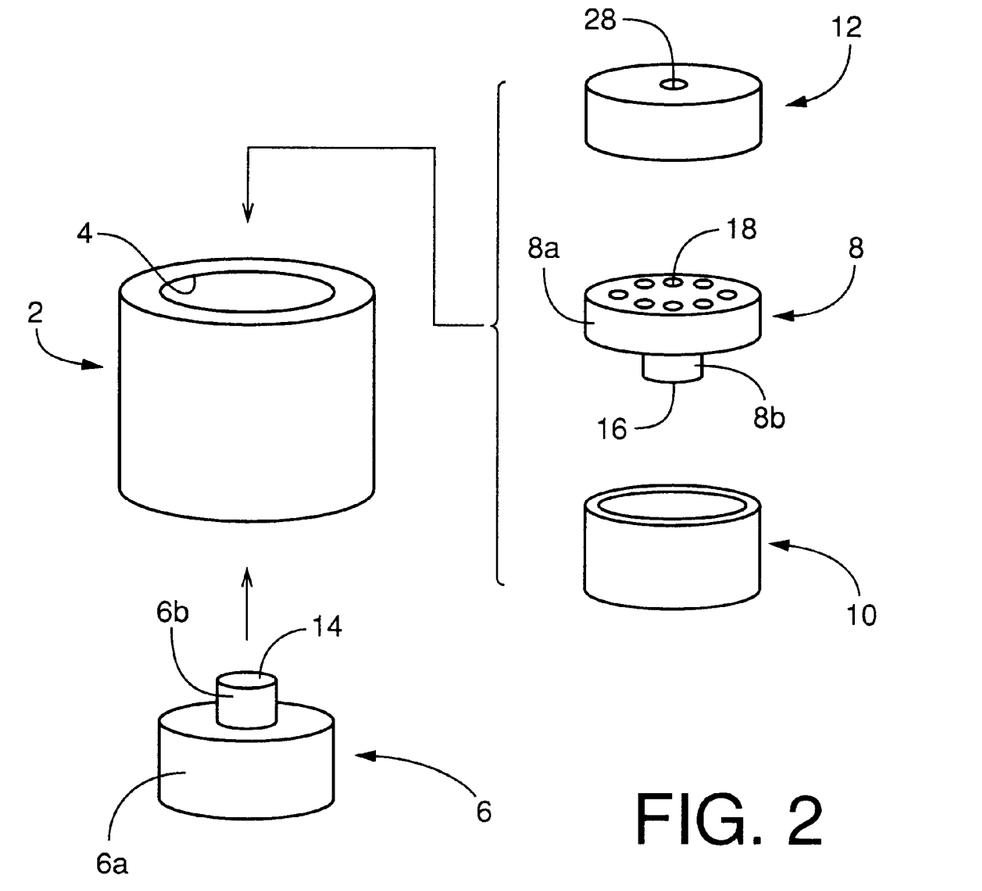
FIG. 2 is a perspective exploded view of the mold assembly of FIG. 1.

Described in detail referring first to FIGS. 1 and 2 which show a mold assembly constructed according to one embodiment of the present invention, the mold assembly includes a cylindrical body 2 having an inner bore 4, a lower mold half 6, and an upper mold half 8. The lower and upper mold halves 6, 8 are fitted in the inner bore 4 of the cylindrical body 2 with a cylindrical spacer 10 interposed therebetween, so that the lower and upper mold halves 6, 8 are positioned so as to oppose each other with a suitable axial distance therebetween. The mold assembly further includes a lid member 12 which is fitted on the upper mold half 8.

The lower mold half 6 includes a cylindrical base portion 6a with a relatively large diameter and a large thickness or height, and a cylindrical molding portion 6b with a relatively small diameter, which protrudes from a central part of the upper surface of the cylindrical base portion 6a in the axially upward direction (as seen in FIGS. 1 and 2). The end face of the cylindrical molding portion 6b is formed to serve as a lower molding surface 14 having a contour substantially following that of one of opposite surfaces of the optical portion (lens body) of the lens product. With the thus constructed lower mold half 6 being fitted in the inner bore 4 of the cylindrical body 2, a lower annular spacing is defined between the outer circumferential surface of the cylindrical molding portion 6b of the lower mold half 6 and the corresponding axial portion of the inner circumferential surface of the cylindrical body 2. The cylindrical base portion 6a is fluid-tightly fitted in the inner bore 4, to thereby close the lower open end of the inner bore 4.

The upper mold half 8 has a cylindrical base portion 8a with a relatively large diameter, and a cylindrical molding portion 8b protruding from a central part of the lower surface of the cylindrical base portion 8a in the axially downward direction (as seen in FIGS. 1 and 2). The end face of the cylindrical molding portion 8b is formed to serve as an upper molding surface 16 having a contour substantially following that of the other surface of the lens product. With the thus constructed upper mold half 8 being fitted in the inner bore 4 of the cylindrical body 2, an upper annular spacing is defined between the outer circumferential surface of the cylindrical molding portion 8b of the upper mold half 8 and the corresponding axial portion of the inner circumferential surface of the cylindrical body 2.

The cylindrical base portion 8a of the upper mold half 8 has a plurality of axial through-holes 18 (eight through-holes in this embodiment) formed through its entire thickness. These through-holes 18 are equiangularly spaced from each other in the circumferential surface of the cylindrical base portion 8a, so that the through-holes 18 are located around the cylindrical molding portion 8b. It is desirable to form at least three through-holes 18 in the cylindrical base portion 8a. If the number of the through-holes 18 is smaller than three, the amount of the monomer composition to be supplied to the mold cavity to compensate for its polymerization shrinkage in the mold cavity is insufficient. In this case, the molded surfaces of the obtained lens product do not have profiles which exactly follow those of the lower and upper molding surfaces 14, 16, respectively, due to the insufficient supply of the monomer composition, resulting in uneven surfaces of the obtained lens product.

The thus constructed upper mold half 8 is positioned in an upper axial portion of the inner bore 4 of the cylindrical body 2, such that the outer circumferential surface of the base portion 8a is held in close contact with the corresponding axial portion of the inner circumferential surface of the cylindrical body 2, so that the molding portion 8b of the upper mold half 8 is opposed to the molding portion 6b of the lower mold half 6, as shown in FIG. 1. With the upper mold half 8 being thus positioned in the inner bore 4, an upper chamber 22 for accommodating the monomer composition therein is defined by the upper surface of the base portion 8a of the upper mold half 8 and the inner surface of the the lid member 12 which is fitted in the upper open end portion of the inner bore 4, while an annular intermediate chamber 20 to be filled with the monomer composition is provided by the lower and upper annular spacings described above, that is, defined by the upper and lower surfaces of the respective base portions 6a and 8a, the circumferential surfaces of the respective molding portions 6b and 8b, and the corresponding axial portion of the inner circumferential surface of the cylindrical body 2. The thus formed intermediate chamber 20 and upper chamber 22 function as monomer storage portions.

In the present mold assembly constructed as described above, the lower molding surface 14 of the lower mold half 6 and the upper molding surface 16 of the upper mold half 8 cooperate with each other to define a mold cavity 24 that gives the intended lens product (which gives an optical portion of an intraocular lens in this embodiment). The axial dimension of the mold cavity 24 is determined by the cylindrical spacer 10 sandwiched by and between the base portion 6a of the lower mold half 6 and the base portion 8a of the upper mold half 8, such that the radially outer or peripheral portions of the lower and upper molding surfaces 14, 16 are spaced apart from each other by a relatively small axial distance. In this arrangement, the mold cavity 24 is formed with a circumferential opening 26 extending along the entire circumference, for permitting fluid communication between the annular intermediate chamber and the mold cavity 24.

Since the mold cavity 24 defined by the two molding surfaces 14, 16 of the respective lower and upper mold halves 6, 8 gives the intended lens product by polymerization of the monomer composition filled therein, the mold cavity 24 has a configuration following that of the lens product. In general, the mold cavity 24 has a configuration which gives at least an optical portion (lens body) of the lens product. In other words, the lower and upper molding surfaces 14, 16 defining the mold cavity 24 are shaped to give at least opposite surfaces of the optical portion of the lens product.

The lid member 12 is a cup-shaped member having a pressurized gas inlet hole 28 formed through the thickness of a central part of the bottom wall. This lid member 12 is fitted in the inner bore 4 of the cylindrical body 2, so as to close the upper open end of the inner bore 4, whereby the upper chamber 22 is defined by the inner surface of the lid member 12 and the upper surface of the base portion 8a of the lower mold half 8. The thus formed upper chamber 22 is held in communication with the space outside the mold assembly through the pressurized gas inlet hole 28.

The materials of the mold assembly, i.e., cylindrical body 2, lower and upper mold halves 6, 8, spacer 10 and lid member 12 are not particularly limited, as long as the materials are not adversely affected by the monomer composition with which these members are brought into contact. For instance, the cylindrical body 2, lower and upper mold halves 6, 8, spacer 10 and lid member 12 are formed of a fluoro-resin such as polytetrafluoroethylene, a polyolefin resin such as polypropylene or polyethylene, a polyester resin such as polyethyleneterephthalate (PET), or a polyacetal resin. The cylindrical body 2 may be formed of a metallic material. It is desirable that the lower and upper mold halves 6, 8, spacer 10, and lid member 12 be formed of a resin material since the lens product formed in the mold cavity 24 is generally separated from an integral assembly including the lens product and the lower and upper mold halves 6, 8, by effecting a cutting operation on this integral assembly by a lathe, for example.

According to the present method of molding the lens product by using the mold assembly constructed as described above, the mold cavity 24 is filled with the suitably selected monomer composition, and a suitable amount of the monomer composition is accommodated in the monomer storage space (20, 22). In this condition, the monomer composition is polymerized at a temperature of 10–80° C., preferably 30–60° C., while a pressure is applied directly to the mass of the monomer composition in the storage space (the mass in the upper chamber 22, in particular). This pressure is higher than the atmospheric pressure generally by 0.05–1.0 MPa, preferably 0.1–0.5 MPa.

Figure 3:
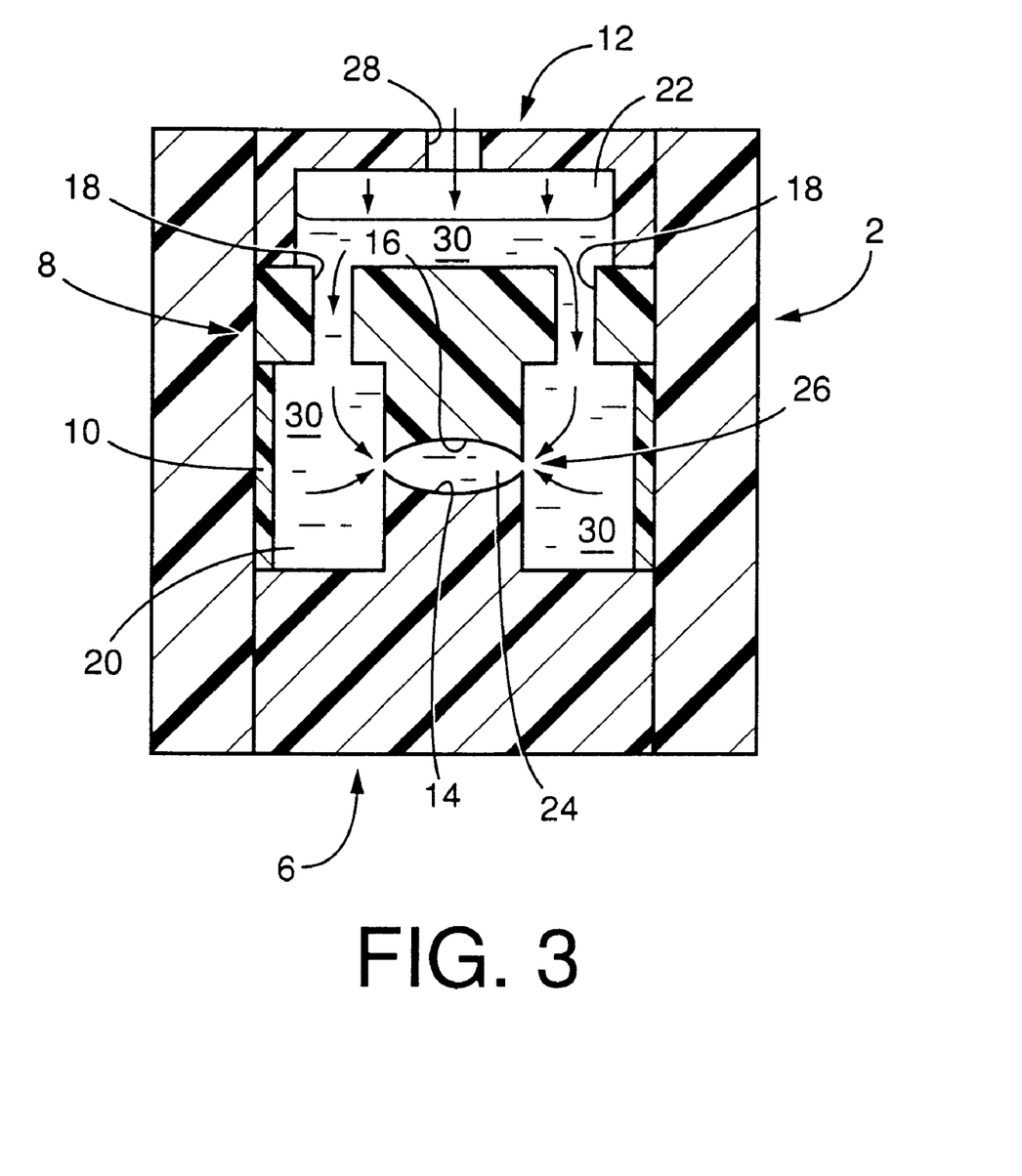
FIG. 3 is an elevational view in axial cross section of the mold assembly of FIG. 1 in which the monomer composition is accommodated.

More specifically described referring to FIG. 3, the mold cavity 24 and the intermediate chamber 20 of the mold assembly are filled with a liquid monomer composition 30 which gives a polymer product that constitutes the lens product. The liquid monomer composition 30 is also accommodated in the upper chamber 22. The mold assembly is then placed within a suitable pressure vessel, and the pressure in the pressure vessel is made higher than the atmospheric pressure, so that the pressurized atmosphere in the vessel is introduced into the upper chamber 22 through the inlet hole 28 of the lid member 28, and acts on the liquid surface of the monomer composition 30 in the upper chamber 22. In this state, the monomer composition 30 is polymerized. According to this arrangement, the monomer composition 30 can be effectively and sufficiently supplied into the mold cavity 24 from the upper chamber 22 and the intermediate chamber 20 through the circumferential opening 26, owing to the pressure applied directly to the liquid surface of the monomer composition 30 in the upper chamber 22, so that the lens product to be formed in the mold cavity 24 does not suffer from shortage of the monomer composition caused by its shrinkage in the polymerization process. Therefore, the molded surfaces of the lens product exactly follow the profiles of the molding surfaces 14, 16, respectively, without an adverse influence by the polymerization shrinkage of the monomer composition. Accordingly, the obtained ophthalmic lens product has the desired optical surfaces.

For effectively feeding the monomer composition 30 into the mold cavity 24 from the upper chamber 22 and intermediate chamber 20 each functioning as the monomer storage portion, the monomer composition 30 in the upper chamber 22 needs to be subjected to a pressure higher than the atmospheric pressure. In order to assure an effective flow of the monomer composition 30 into the mold cavity 24 while taking account of the pressure resistance or tightness of the pressure vessel in which the mold assembly is accommodated, the pressure which acts on the monomer composition 30 is preferably made higher than the atmospheric pressure by 0.05–1.0 MPa, preferably by 0.1–0.5 MPa. For applying such a high pressure to the monomer composition 30 in the upper chamber 22, a suitable pressurized gas, for example, nitrogen, or an inert gas such as helium, or oxygen or air, is introduced into the pressure vessel. Preferably, the pressurized nitrogen or helium or other inert gas is introduced into the vessel.

Owing to the direct application of the pressure higher than the atmospheric pressure to the liquid surface of the monomer composition 30 in the upper chamber 22 as described above, the evaporation of the monomer composition 30 from the upper chamber 22 can be effectively prevented. For effective polymerization of the monomer composition 30 while preventing its evaporation, the monomer composition 30 is polymerized at a temperature of 10–80° C., preferably 30–60° C., so that the monomer composition 30 does not suffer from an undesirable compositional variation, to obtain the polymer product (i.e., the lens product) having the intended properties.

When the lens product is formed by using the mold assembly shown in FIGS. 1 and 2, the monomer composition 30 can be effectively and sufficiently fed from the intermediate chamber 20 into the mold cavity 24 through the circumferential opening 26, to which the monomer composition 30 is supplied from the upper chamber 22 via the through-holes 18, thereby compensating for shortage of the monomer composition 30 in the mold cavity 24 caused by its shrinkage during the polymerization. Owing to the effective flow of the monomer composition 30 as the ophthalmic lens composition, the obtained lens product (polymer product) has the desired configuration exactly following that of the mold cavity 24, so that the molded surfaces of the lens product are even and smooth without being adversely affected by the polymerization shrinkage of the monomer composition 30.

In the mold assembly constructed as described above, the monomer composition 30 is first fed from the upper chamber 22 to the intermediate chamber 20 via the through-holes 18, and is eventually fed into the mold cavity 24 through the circumferential opening 26, so that the mold cavity 24 is filled with the monomer composition 30. In this arrangement, even if the monomer composition 30 in the upper chamber 22 is evaporated and suffers from its compositional variation during the polymerization, the monomer composition 30 in the intermediate chamber 20 and the mold cavity 24 is free from an adverse influence of the evaporation of the monomer composition 30 in the upper chamber 22. In addition, the through-holes 18 formed in the cylindrical base portion 8a of the upper mold half 8 can be utilized as inlet holes through which the monomer composition 30 can be fed from the upper chamber 22 to the intermediate chamber 20 without such an adverse influence.

The monomer composition 30 is introduced into the thus constructed mold assembly with or without the lid member 12 being attached thereto, so that the monomer composition 30 is supplied to the mold cavity 24 via the through-holes 18. In the present arrangement, the intermediate chamber 20 and the mold cavity 24 can be deaerated or degassed via the through-holes 18. Accordingly, it is not necessary to specially provide a degassing hole, resulting in a simplified structure of the mold assembly. Since the monomer composition 30 in the intermediate chamber 20 and the upper chamber 22 as the monomer storage space are polymerized at the same time when the monomer composition 30 in the mold cavity 24 is polymerized, the present mold assembly does not require any special radiation shielding means (e.g., a mask) as required in the conventional mold assembly for inhibiting the polymerization of the excess monomer composition due to exposure to a radiation. Moreover, the present mold assembly does not require any special mechanism for removing the mold halves 6, 8 from the body 2 or removing the molded product from the mold assembly, resulting in a further simplified structure of the mold assembly.

In the mold assembly constructed as described above, the monomer composition 30 accommodated in the upper chamber 22 is effectively prevented from being evaporated by the lid member 12 which closes the opening of the upper chamber 22, while at the same time, the monomer composition 30 in the upper chamber 22 is effectively subjected to the pressurized gas applied through the inlet hole 28 of the lid member 12.

The monomer composition 30 which is polymerized to produce the lens product includes at least one monomer known in the art, which monomer gives the polymer product that constitutes the ophthalmic lens product. Alternatively, the monomer composition 30 may be a macromer or a prepolymer. Such a monomer is a radically polymerizable compound which includes at least one of vinyl, allyl, acryl and methacryl groups in its molecule, and which is conventionally used as a material for a hard contact lens, a soft contact lens or an intraocular lens. Examples of the compound include: esters of (meth)acrylic acid such as alkyl (meth)acrylate, siloxanyl (meth)acrylate, fluoroalkyl (meth) acrylate, hydroxyalkyl (meth)acrylate, polyethyleneglycol (meth)acrylate, a polyhydricalcohol (meth)acrylate; derivatives of styrene; and N-vinyllactam. The monomer composition 30 includes, as needed, a polyfunctional monomer as a cross-linking agent, such as ethyleneglycol di(meth) acrylate, diethyleneglycol di(meth)acrylate or butanediol di(meth)acrylate.

In the present invention, it is preferable to use at least one monomer selected from among: aromatic ring-containing acrylate such as phenoxyethyl acrylate, phenylethyl acrylate or benzyl acrylate; alkyl acrylate such as ethyl acrylate, n-butyl acrylate or isobutyl acrylate; hydroxyl group-containing alkyl (meth)acrylate such as hydroxyethyl (meth) acrylate or hydroxybutyl (meth)acrylate; hydrophilic monomer such as dimethyl (meth)acrylamide or N-vinyllactam; cross-linking monomer such as butanediol di(meth)acrylate or ethyleneglycol di(meth)acrylate, and silicon-containing (meth)acrylate.

The monomer composition may further include, as additives, a polymerization initiator and a photosensitizer. The monomer composition 30 in a liquid form is introduced into the mold assembly to fill the mold cavity 24 as shown in FIG. 3, and is then polymerized according to a known polymerization method. For instance, the monomer composition 30 is polymerized according to a thermal polymerization method wherein the monomer composition 30 to which a suitable radical polymerization initiator is added is heated to a temperature within the specified range of the present invention, or a radiation polymerization method wherein the monomer composition 30 is polymerized by exposure to a microwave, a UV light, or an electromagnetic wave such as a radiation (gamma ray).

When the monomer composition 30 is polymerized by the thermal polymerization method, it is effective to raise the polymerization temperature in steps within the range specified in the present invention. Further, the monomer composition 30 may be otherwise polymerized. For instance, the monomer composition 30 may be polymerized by bulk polymerization or solution polymerization using a suitable solvent. Examples of the above-described radical polymerization initiator which permits effective polymerization of the monomer composition 30 include 2,2'-azobisisobutyronitrile, 2,2'-azobis(2,4-dimethyl valeronitrile), 2,2'-azobis(2-methylbutyronitrile), 2,2'-azobis(4-methoxy-2,4-dimethyl valeronitrile), benzoyl peroxide, tert.-butyl hydroperoxide, and cumene hydroperoxide. Any one of, or any combination of those radical polymerization initiators may be suitably used. When the monomer composition 30 is polymerized by exposure to a light, the monomer composition 30 preferably contains the photopolymerization initiator or photosensitizer. The amount of such a photopolymerization initiator or photosensitizer to be added to the monomer composition 30 is preferably 0.002–10 parts by weight, more preferably 0.01–2 parts by weight, per 100 parts by weight of the polymeric component (i.e., total monomer content).

By thus polymerizing the monomer composition 30 in the mold assembly constructed as described above, there is produced an integral assembly which includes the polymer product and at least the lower and upper mold halves 6, 8. After the integral assembly is removed from the cylindrical body 2 by applying a pressing force therebetween, for instance, the removed integral assembly is subjected to a suitable operation such as a machining operation, so that the lower and upper mold halves 6, 8 are separated from the lens product formed in the mold cavity 24 defined by the lower molding surface 14 of the lower mold half 6 and the upper molding surface 16 of the upper mold half 8. Thus, the intended lens product is obtained. For removing the lower and upper mold halves 6, 8 from the lens product formed in the mold cavity 24, the integral assembly is immersed in a suitable solvent such as ethanol to an extent that the lens product is impregnated with the solvent, and the mold halves 6, 8 are separated from the lens product. Alternatively, the mold halves 6, 8 may be removed by application of a sufficient force to move them away from each other. Alternatively, the mold halves 6, 8 may be removed while the lens product is solidified by cooling. While the thus obtained lens product is in the form of a precursor that gives the intended ophthalmic lens, the precursor is subjected to a suitable machining operation such as cutting or grinding, so that the intended ophthalmic lens is obtained.

While the present invention has been described in detail in its presently preferred embodiment, it is to be understood that the invention is not limited to the details of the above embodiment, but may be otherwise embodied with various other changes, modifications and improvements, which may occur to those skilled in the art.

While the mold assembly in the above embodiment is suitably used for forming the ophthalmic lens product according to the present invention, the lens product may be formed by using other mold assemblies, provided that the mold assemblies have a monomer storage space which is held in fluid communication with the mold cavity, and that a suitable pressurized gas acts on the mass of the monomer composition accommodated in the monomer storage space according to the present invention.

In the mold assembly of the above embodiment, the lower mold half 6 separate from the cylindrical body 2 is fitted in the inner bore 4 of the cylindrical body 2, so as to close the lower open end of the inner bore 4. The cylindrical body 2 and the lower mold half 6 may be formed integrally with each other. While the lower molding surface 14 of the lower mold half 6 and the upper mold surface 16 of the upper mold half 8 of the mold assembly used in the above embodiment are both curved concave surfaces, at least one of the lower and upper molding surfaces 14, 16 may be a curved convex surface, as in a mold assembly shown in FIG. 4, depending upon the configuration of the lens product to be obtained. The detailed explanation of the mold assembly of FIG. 4 is dispensed with, since the mold assembly of FIG. 4 is identical in construction with the mold assembly of FIG. 1, except that the upper molding surface 16 of the upper mold half 8 is a curved convex surface.

Figure 4:
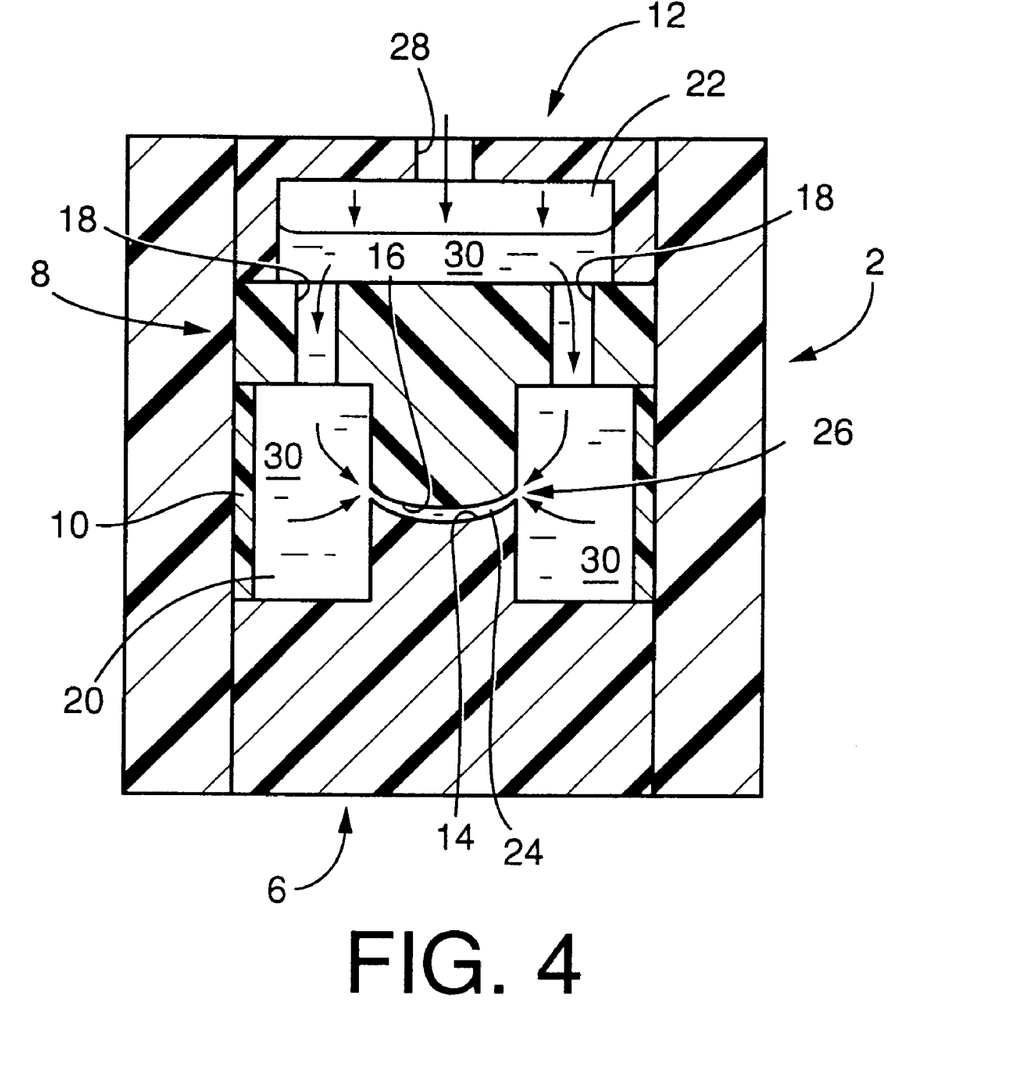
FIG. 4 is an elevational view in axial cross section of a mold assembly used in another embodiment of the invention, the view corresponding to that of FIG. 1.

Preferably, the lower and upper mold halves 6, 8 are positioned relative to each other within the inner bore 4 of the cylindrical body 2 with the spacer 10 interposed therebetween, as in the mold assemblies of FIG. 1 and FIG. 4. It is needless to mention that any other means may be employed to suitably position the lower and upper mold halves 6, 8 relative to each other.

For applying the pressure higher than the atmospheric pressure directly to the monomer composition 30 accommodated in the monomer storage space (22) according to the present invention, the mold assembly is placed in the pressure vessel into which a suitable pressurized gas is introduced, to thereby increase the pressure in the vessel. The pressurized gas in the vessel is introduced into the mold assembly through the inlet hole 28 of the lid member 12, so that the pressurized gas acts directly on the monomer composition 30 in the monomer storage portion (22). The pressurized gas may be otherwise applied to the monomer composition 30 in the monomer storage portion (22). For instance, the inlet hole 28 of the lid member 12 is connected directly to a pressurized gas source from which the pressurized gas is introduced into the upper chamber 22.

Figure 5:
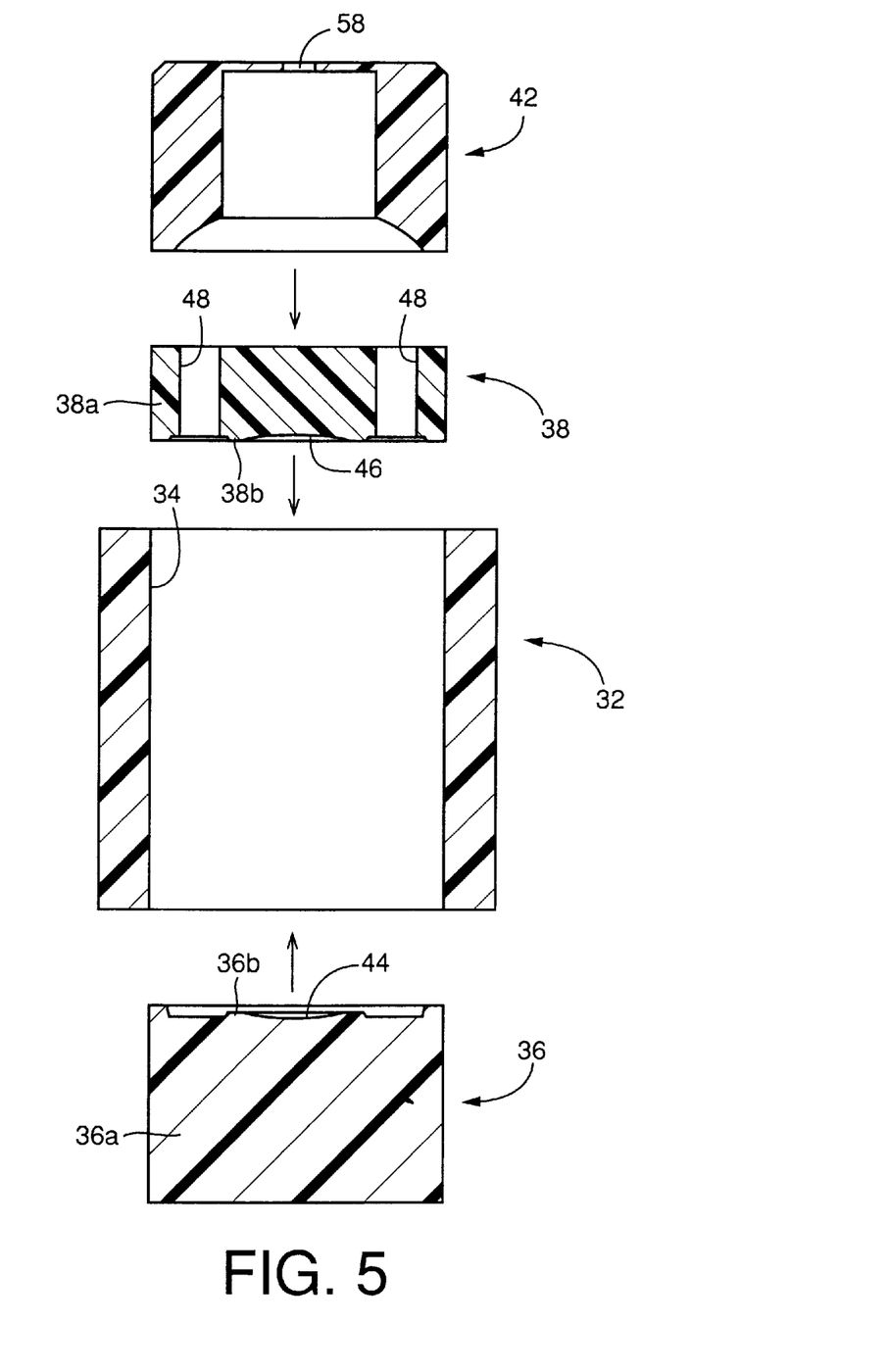
FIG. 5 is an elevational exploded view in axial cross section of a mold assembly used in still another embodiment of the invention.
Figure 6:
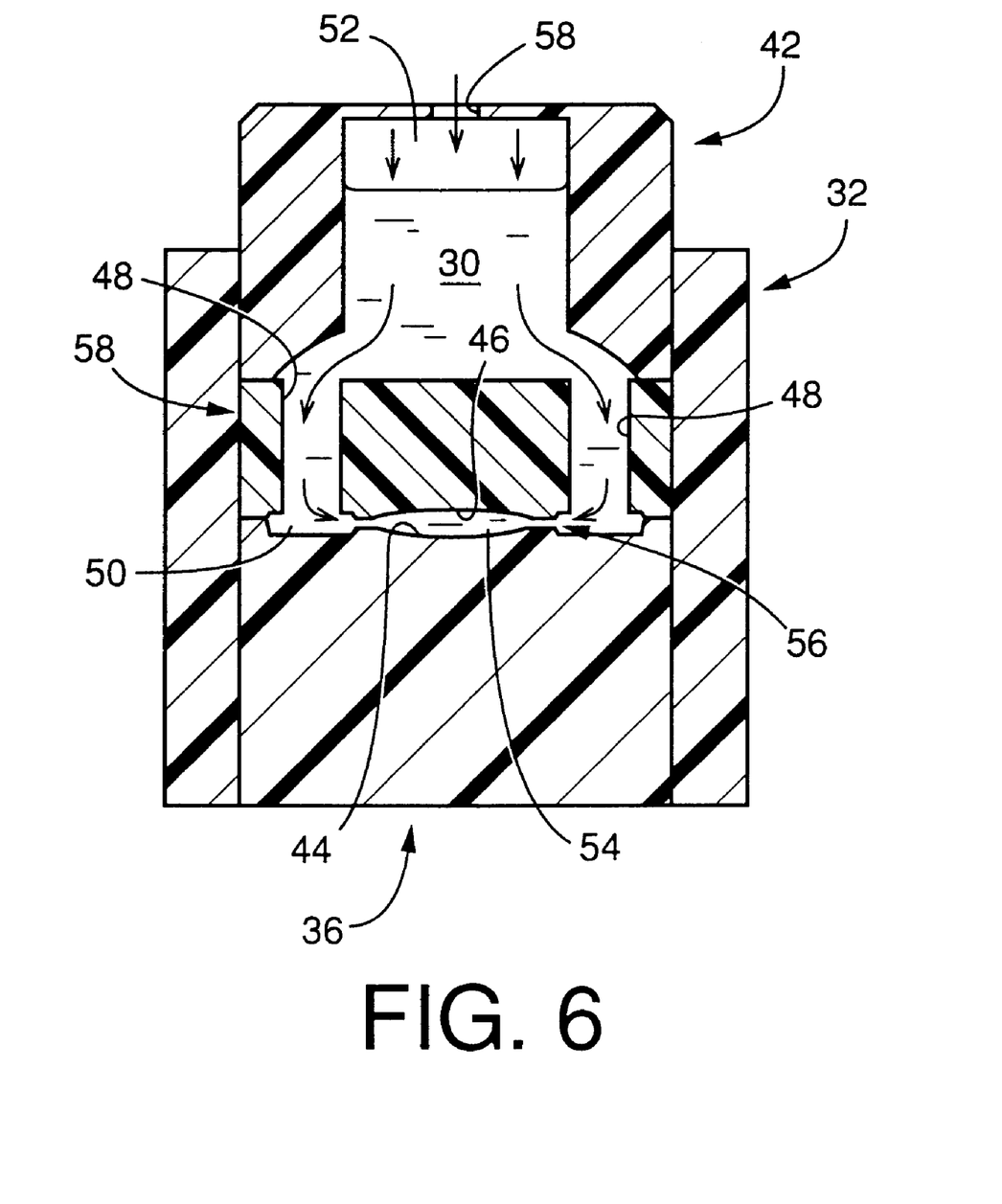
FIG. 6 is an elevational view in axial cross section of the mold assembly of FIG. 5 in which the monomer composition is accommodated.

Referring next to FIGS. 5 and 6, there is shown another mold assembly suitably used in molding the ophthalmic lens product according to the method of the present invention. This mold assembly consists of a cylindrical body 32, a lower mold half 36, an upper mold half 38, and a lid member 42. The lower and upper mold halves 36, 38 are fitted in an inner bore 34 of the cylindrical body 32, so as to define a mold cavity 54 between a lower molding surface 44 of the lower mold half 36 and an upper molding surface 46 of the upper mold half 38, as in the mold assemblies of FIG. 1 and FIG. 4. The lid member 42 having a cup-like shape is superposed on the upper mold half 38, to form an upper chamber 52 defined by the inner space of the cup-like lid member 42. In this mold assembly, the height or thickness of the molding portions 36*b*, 38*b* of the respective lower and upper mold halves 36, 38 is made considerably small, as compared with that of the molding portions 6*b*, 8*b* of the respective lower and upper mold halves 6, 8 in the mold assemblies of FIGS. 1 and 4, so that the present mold assembly does not require the spacer 10 as used in the mold assemblies of the above embodiments. Further, the thus constructed mold assembly has an intermediate chamber 50 whose volume is smaller than that of the intermediate chamber 20 of the mold assemblies of the above embodiments.

In the thus constructed mold assembly, the monomer composition 30 accommodated in the upper chamber 52 is subjected to an external pressure higher than the atmospheric pressure applied through an inlet hole 58 formed through the thickness of the lid member 42, while the monomer composition 30 in the upper chamber 52 is exposed to the ambient atmosphere. In this arrangement, if the ambient atmosphere is air, the polymerization of the monomer composition 30 in the upper chamber 52 is retarded or restricted by its contact with the air, whereby the polymerization of the monomer composition 30 in the mold cavity 54 is promoted as compared with that of the monomer composition 30 in the upper chamber 52. Accordingly, the monomer composition 30 in the upper chamber 52 can be easily and effectively supplied to the mold cavity 54 through a circumferential opening 56, so that the lens product to be formed in the mold cavity 54 has the desired configuration without being adversely affected by the shrinkage of the monomer composition during polymerization. In other words, the monomer composition 30 in the mold cavity 54 which gives by polymerization the optical portion of the lens product is polymerized faster than the monomer composition 30 in the upper chamber 52, so that the monomer composition 30 in the upper chamber 52 can be effectively supplied to the mold cavity 24 for compensating for the polymerization shrinkage.

In the present mold assembly, the rate of polymerization of the monomer composition 30 in the upper chamber 52 is determined by an area of the liquid surface of the monomer composition 30 which is held in contact with the air, so that the rate of polymerization of the monomer composition in the upper chamber 52 can be adjusted as desired by using different lid members 42 having different inside diameters. If each of the different lid members 42 has the inside diameter which is constant over the entire axial length, the area of the liquid surface of the monomer composition 30 in the upper chamber 52, which surface contacts the air, is kept constant irrespective of a variation in the amount of the monomer composition 30 to be introduced in the mold assembly. Accordingly, the monomer composition 30 can be polymerized with high stability. In addition, the mold assembly of FIGS. 5 and 6 has the intermediate chamber 50 whose volume is smaller than that of the intermediate chamber 20 of the mold assemblies of FIG. 1 and FIG. 4, resulting in reduction of the required amount of the monomer composition 30.

EXAMPLE

To further clarify the concept of the present invention, there will be described one example of the invention. It is to be understood that the present invention is not limited to the details of the illustrated example.

A plurality of ophthalmic lens products were prepared by using respective mold assemblies shown in FIGS. 1 and 2, in the following manner.

Initially, a monomer composition (30) was prepared by using 70 parts by weight of phenoxyethyl acrylate, 30 parts by weight of ethyl acrylate, 15 parts by weight of 2-hydroxyethyl methacrylate, 4 parts by weight of butanediol diacrylate as the cross-linking agent, and 0.5 part by weight of 2,2'-azobis(2,4-dimethyl valeronitrile) as the radical polymerization initiator. The thus prepared monomer composition (30) was introduced into the upper chamber (22) of each mold assembly, so that the monomer composition (30) is fed into the intermediate chamber (20) via the through-holes (18), and is then fed into the mold cavity (24) via the circumferential opening (26), whereby the mold cavity (24) was filled with the monomer composition (30). Thereafter, each mold assembly was accommodated in the pressure vessel whose internal pressure was kept at 0.4 MPa (absolute pressure). In this state, the monomer composition in each mold assembly was polymerized at 50° C. for 48 hours.

As comparative examples, a plurality of mold assemblies whose mold cavities were filled with the monomer composition (30) were left in the atmosphere without being accommodated in the pressure vessel. In this state, the monomer composition (30) in each mold assembly was polymerized at 50° C. for 48 hours.

Each of the thus obtained integral assemblies including the respective polymer products, which gives the optical portion of the intended intraocular lens, was removed from the cylindrical body (2) of the assembly, and was subjected to a cutting operation to remove the radially outer portion to reduce its diameter to a suitable extent. Then, the lower and upper mold halves 6, 8 were separated from the lens product formed in the mold cavity (24). The molded surfaces of nine lens products obtained by polymerization according to the present invention were inspected for any defects such as crimps and dimples (so-called "sink or shrink mark"). It was confirmed that none of the nine lens products suffered from the sink mark, so that the percentage of appearance of the sink mark was 0%.

In contrast, the molded surfaces of three of the eight lens products obtained (as the comparative examples) by polymerization under the atmosphere suffered from the sink mark, so that the percentage of appearance of the sink mark was 38%.

As is apparent from the above description, the present method of molding the ophthalmic lens product permits a considerably effective flow of the monomer composition to the mold cavity for compensating for its shrinkage caused in the mold cavity during polymerization, by applying a suitably pressurized gas directly to a mass of the monomer composition accommodated in the monomer storage space in the mold assembly. According to the present method, the lens product can be formed into the desired configuration with high accuracy, so that the molded surfaces of the lens product have profiles exactly following those of the molding surfaces defining the mold cavity. In addition, the evaporation of the monomer composition in the mold cavity during its polymerization can be effectively minimized, to thereby prevent a variation in the composition of the monomer composition, and accordingly prevent a variation in the properties of the lens product to be obtained, assuring improved quality consistency of the lens product.

What is claimed is:

1. A method of molding an ophthalmic lens product by using a mold assembly which has a mold cavity, said lens product having a configuration corresponding to that of an ophthalmic lens or a precursor of said ophthalmic lens and being obtained by polymerizing a liquid monomer composition in said mold cavity to provide a polymer product which gives said lens product, the method comprising the steps of:

preparing said mold assembly having a monomer storage space for storing said liquid monomer composition, which storage space is held in fluid communication with said mold cavity, said mold cavity of said mold assembly being formed with a circumferential opening extending along an entire circumference thereof;

filling said mold cavity of said mold assembly with said liquid monomer composition such that said monomer composition is introduced into said mold cavity through said circumferential opening while said liquid monomer composition is accommodated in said monomer storage space; and polymerizing said liquid monomer composition at a temperature of 10–80° C. while a pressure higher than the atmospheric pressure is applied directly to a liquid surface of a mass of said liquid monomer composition accommodated in said monomer storage space.

2. A method according to claim 1, wherein said mold assembly comprises:

a cylindrical body having an inner bore;

a lower mold half consisting of a cylindrical base portion which is fitted in a lower portion of said inner bore, so as to close a lower open end of said inner bore, and a cylindrical molding portion protruding from an upper surface of said base portion in an axially upward direction of said mold assembly and having an end face serving as a lower molding surface which has a profile following that of one of opposite surfaces of said lens product, said molding portion having a diameter smaller than that of said base portion so as to define a lower annular spacing between an outer circumferential surface of said molding portion and an inner circumferential surface of said cylindrical body; and an upper mold half consisting of a cylindrical base portion which is fitted in an upper portion of said inner bore so as to partially define an upper chamber for accommodating said mass of said monomer composition, on the side of an upper open end of said inner bore, and a cylindrical molding portion protruding from a lower surface of said base portion in an axially downward direction of said mold assembly and having an end face serving as an upper molding surface which has a profile following that of the other surface of said lens product, said molding portion having a diameter smaller than that of said base portion so as to define an upper annular spacing between an outer circumferential surface of said molding portion and the inner circumferential surface of said cylindrical body, said lower annular spacing and said upper annular spacing cooperating to provide an annular intermediate chamber, while said upper molding surface and said lower molding surface cooperating with each other to define therebetween said mold cavity such that said circumferential opening open to said annular intermediate chamber is formed along an entire circumference of said mold cavity, for introducing said monomer composition into said mold cavity, said base portion of said upper mold half having a plurality of through-holes formed therethrough such that said through-holes are equiangularly spaced from each other in the circumferential direction of said base portion and communicate with said upper chamber and said intermediate chamber.

3. A method according to claim 2, wherein said mold assembly further comprises inlet defining means for defining an inlet at said upper open end of said inner bore, which inlet permits communication between said upper chamber and an exterior of said mold assembly, so that a pressurized gas is introduced into said upper chamber.

4. A method according to claim 3, wherein said step of filling said mold cavity comprises introducing said monomer composition into said intermediate chamber from said upper chamber, and feeding said monomer composition from said intermediate chamber into said mold cavity through said circumferential opening, so as to fill said mold cavity and said intermediate chamber with said monomer composition, and store said mass of said monomer composition in said upper chamber, and wherein said step of polymerizing said monomer composition comprises placing said mold assembly in a pressure vessel, and introducing said pressurized gas having a pressure higher than the atmospheric pressure into said pressure vessel, so that said pressurized gas acts directly on said mass of said monomer composition in said upper chamber through said inlet, and said monomer composition in said mold cavity, said intermediate chamber and said upper chamber is polymerized so as to provide an integral assembly which includes said polymer product and said lower and upper mold halves; and separating said lens product formed in said mold cavity from a rest of said integral assembly.

5. A method according to claim 1, wherein said pressure higher than atmospheric pressure is higher than atmospheric pressure by 0.05–1.0 MPa.

6. A method according to claim 5, wherein said pressure higher than atmospheric pressure is higher than atmospheric pressure by 0.1–0.5 MPa.

7. A method according to claim 1, wherein said step of polymerizing said monomer composition is effected at a temperature in a range of 30–60° C.

8. A mold assembly for molding an ophthalmic lens product which has a configuration corresponding to that of an ophthalmic lens or a precursor of said ophthalmic lens and which is obtained by polymerizing a liquid monomer composition in a mold cavity of the mold assembly to provide a polymer product which gives said lens product, the mold assembly comprising:

a cylindrical body having an inner bore;

a lower mold half consisting of a cylindrical base portion which is fitted in a lower portion of said inner bore, so as to close a lower open end of said inner bore, and a cylindrical molding portion protruding from an upper surface of said base portion in an axially upward direction of said mold assembly and having an end face serving as a lower molding surface which has a profile following that of one of opposite surfaces of said lens product, said molding portion having a diameter smaller than that of said base portion so as to define a lower annular spacing between an outer circumferential surface of said molding portion and an inner circumferential surface of said cylindrical body; and an upper mold half consisting of a cylindrical base portion which is fitted in an upper portion of said inner bore so as to partially define an upper chamber for accommodating said mass of said monomer composition, on the side of an upper open end of said inner bore, and a cylindrical molding portion protruding from a lower surface of said base portion in an axially downward direction of said mold assembly and having an end face serving as an upper molding surface which has a profile following that of the other surface of said lens product, said molding portion of said upper mold half having a diameter smaller than that of said base portion so as to define an upper annular spacing between an outer circumferential surface of said molding portion and the inner circumferential surface of said cylindrical body, said lower annular spacing and said upper annular spacing cooperating to provide an annular intermediate chamber, while said upper molding surface and said lower molding surface cooperating with each other to define therebetween said mold cavity such that a circumferential opening open to said annular intermediate chamber is formed along an entire circumference of said mold cavity, for introducing said monomer composition into said mold cavity, said base portion having a plurality of through-holes formed therethrough such that said through-holes are equiangularly spaced from each other in the circumferential direction of said base portion and communicate with said upper chamber and said intermediate chamber.

9. A mold assembly according to claim 8, further comprising a lid member which is placed on said upper mold half, so as to cooperate with at least said upper mold half to define said upper chamber, said lid member having an inlet for communication between said upper chamber and a space outside said mold assembly.

10. A method of molding an ophthalmic lens product having a configuration corresponding to that of an ophthalmic lens or a precursor of said ophthalmic lens and being obtained by polymerizing a liquid monomer composition in a mold cavity to provide a polymer product which gives said ophthalmic lens product, the method comprising the steps of:

preparing a mold assembly, comprising:
(i) a cylindrical body having an inner bore;
(ii) a lower mold half comprising a cylindrical base portion which is fitted in a lower portion of said inner bore, so as to close a lower open end of said inner bore, and a cylindrical molding portion protruding from an upper surface of said cylindrical base portion in an axially upward direction of said mold assembly and having an end face serving as a lower molding surface which has a profile following that of one of the opposite surfaces of said lens product, said cylindrical molding portion having a diameter smaller than that of said cylindrical base portion so as to define a lower annular spacing between an outer circumferential surface of said cylindrical molding portion and an inner circumferential surface of said cylindrical body; and
(iii) an upper mold half comprising a cylindrical base portion which is fitted in an upper portion of said inner bore so as to partially define an upper chamber for accommodating a mass of said liquid monomer composition, on the side of an upper open end of said inner bore, and a cylindrical molding portion protruding from a lower surface of said cylindrical base portion in an axially downward direction of said mold assembly and having an end face serving as an upper molding surface which has a profile following that of the other surface of said lens product, said cylindrical molding portion having a diameter smaller than that of said cylindrical base portion so as to define an upper annular spacing between an outer circumferential surface of said cylindrical molding portion and an inner circumferential surface of said cylindrical body, said lower annular spacing and said upper annular spacing cooperating to provide an annular intermediate chamber, while said upper molding surface and said lower molding surface cooperating with each other to define therebetween said mold cavity such that a circumferential opening open to said annular intermediate chamber is formed along an entire circumference of said mold cavity, for introducing said liquid monomer composition into said mold cavity, said cylindrical base portion of said upper mold half having a plurality of through-holes formed therethrough such that said through-holes are equiangularly spaced from each other in a circumferential direction of said cylindrical base portion and communicate with said upper chamber and said intermediate chamber; and filling said mold cavity with said liquid monomer composition while said liquid monomer composition is accommodated in said upper chamber; and polymerizing said liquid monomer composition at a temperature of 10–80° C. while a pressure higher than atmospheric pressure is applied directly to a liquid surface of said mass of said liquid monomer composition accommodated in said upper chamber.

11. A method according to claim 10, wherein said pressure higher than atmospheric pressure is higher than atmospheric pressure by 0.05–1.0 MPa.

12. A method according to claim 11, wherein said pressure higher than atmospheric pressure is higher than atmospheric pressure by 0.1–0.5 MPa.

13. A method according to claim 10, wherein said step of polymerizing said liquid monomer composition is effected at a temperature in a range of 30–60° C.

14. A method of molding an ophthalmic lens product having a configuration corresponding to that of an ophthalmic lens or a precursor of said ophthalmic lens and being obtained by polymerizing a liquid monomer composition in a mold cavity to provide a polymer product which gives said ophthalmic lens product, the method comprising the steps of:

preparing a mold assembly, comprising:
(i) a cylindrical body having an inner bore;
(ii) a lower mold half comprising a cylindrical base portion which is fitted in a lower portion of said inner bore, so as to close a lower open end of said inner bore, and a cylindrical molding portion protruding from an upper surface of said cylindrical base portion in an axially upward direction of said mold assembly and having an end face serving as a lower molding surface which has a profile following that of one of the opposite surfaces of said lens product, said cylindrical molding portion having a diameter smaller than that of said cylindrical base portion so as to define a lower annular spacing between an outer circumferential surface of said cylindrical molding portion and an inner circumferential surface of said cylindrical body;
(iii) an upper mold half comprising a cylindrical base portion which is fitted in an upper portion of said inner bore so as to partially define an upper chamber for accommodating a mass of said liquid monomer composition, on the side of an upper open end of said inner bore, and a cylindrical molding portion protruding from a lower surface of said cylindrical base portion in an axially downward direction of said mold assembly and having an end face serving as an upper molding surface which has a profile following that of the other surface of said lens product, said cylindrical molding portion having a diameter smaller than that of said cylindrical base portion so as to define an upper annular spacing between an outer circumferential surface of said cylindrical molding portion and an inner circumferential surface of said cylindrical body, said lower annular spacing and said upper annular spacing cooperating to provide an annular intermediate chamber, while said upper molding surface and said lower molding surface cooperating with each other to define therebetween said mold cavity such that a circumferential opening open to said annular intermediate chamber is formed along an entire circumference of said mold cavity, for introducing said liquid monomer composition into said mold cavity, said cylindrical base portion of said upper mold half having a plurality of through-holes formed therethrough such that said through-holes are equiangularly spaced from each other in a circumferential direction of said cylindrical base portion and communicate with said upper chamber and said intermediate chamber; and
(iv) an inlet defining means for defining an inlet at said upper open end of said inner bore, which said inlet permits communication between said upper chamber and an exterior of said mold assembly to allow pressurized gas to be introduced into said upper chamber; and filling said mold cavity with said liquid monomer composition while said liquid monomer composition is accommodated in said upper chamber; and polymerizing said liquid monomer composition at a temperature of 10–80° C. while a pressure higher than atmospheric pressure is applied directly to a liquid surface of said mass of said liquid monomer composition accommodated in said upper chamber.

15. A method according to claim 14, wherein said pressure higher than atmospheric pressure is higher than atmospheric pressure by 0.05–1.0 MPa.

16. A method according to claim 15, wherein said pressure higher than atmospheric pressure is higher than atmospheric pressure by 0.1–0.5 Mpa.

17. A method according to claim 14, wherein said step of polymerizing said liquid monomer composition is effected at a temperature in a range of 30–60° C.

18. A method of molding an ophthalmic lens product having a configuration corresponding to that of an ophthalmic lens or a precursor of said ophthalmic lens and being obtained by polymerizing a liquid monomer composition in a mold cavity to provide a polymer product which gives said ophthalmic lens product, the method comprising the steps of:

preparing a mold assembly, comprising:
(i) a cylindrical body having an inner bore;
(ii) a lower mold half comprising a cylindrical base portion which is fitted in a lower portion of said inner bore, so as to close a lower open end of said inner bore, and a cylindrical molding portion protruding from an upper surface of said cylindrical base portion in an axially upward direction of said mold assembly and having an end face serving as a lower molding surface which has a profile following that of one of the opposite surfaces of said lens product, said cylindrical molding portion having a diameter smaller than that of said cylindrical base portion so as to define a lower annular spacing between an outer circumferential surface of said cylindrical molding portion and an inner circumferential surface of said cylindrical body;
(iii) an upper mold half comprising a cylindrical base portion which is fitted in an upper portion of said inner bore so as to partially define an upper chamber for accommodating a mass of said liquid monomer composition, on the side of an upper open end of said inner bore, and a cylindrical molding portion protruding from a lower surface of said cylindrical base portion in an axially downward direction of said mold assembly and having an end face serving as an upper molding surface which has a profile following that of the other surface of said lens product, said cylindrical molding portion having a diameter smaller than that of said cylindrical base portion so as to define an upper annular spacing between an outer circumferential surface of said cylindrical molding portion and an inner circumferential surface of said cylindrical body, said lower annular spacing and said upper annular spacing cooperating to provide an annular intermediate chamber, while said upper molding surface and said lower molding surface cooperating with each other to define therebetween said mold cavity such that a circumferential opening open to said annular intermediate chamber is formed along an entire circumference of said mold cavity, for introducing said liquid monomer composition into said mold cavity, said cylindrical base portion of said upper mold half having a plurality of through-holes formed therethrough such that said through-holes are equiangularly spaced from each other in a circumferential direction of said cylindrical base portion and communicate with said upper chamber and said intermediate chamber; and
(iv) an inlet defining means for defining an inlet at said upper open end of said inner bore, which said inlet permits communication between said upper chamber and an exterior of said mold assembly to allow pressurized gas to be introduced into said upper chamber; and filling said mold cavity with said liquid monomer composition by introducing said liquid monomer composition into said intermediate chamber from said upper chamber, and feeding said liquid monomer composition from said intermediate chamber into said mold cavity through said circumferential opening, so as to fill said mold cavity and said intermediate chamber with said liquid monomer composition, and store said mass of said liquid monomer composition in said upper chamber;

polymerizing said liquid monomer composition at a temperature of 10–80° C. by placing said mold assembly in a pressure vessel, and introducing said pressurized gas having a pressure higher than atmospheric pressure into said pressure vessel, so that said pressurized gas acts directly on said mass of said liquid monomer composition in said upper chamber through said inlet and said liquid monomer composition in said mold cavity, whereby said intermediate chamber and said upper chamber are polymerized so as to provide an integral assembly which includes said polymer product and said lower and upper mold halves; and separating said lens product formed in said mold cavity from the rest of said integral assembly.

19. A method according to claim 18, wherein said pressure higher than atmospheric pressure is higher than atmospheric pressure by 0.05–1.0 MPa.

20. A method according to claim 19, wherein said pressure higher than atmospheric pressure is higher than atmospheric pressure by 0.1–0.5 MPa.

21. A method according to claim 18, wherein said step of polymerizing said liquid monomer composition is effected at a temperature in a range of 30–60° C.

* * * * *